United States Patent [19]

Gonzalez

[11] 4,310,724
[45] Jan. 12, 1982

[54] CURRENT DETECTOR CIRCUIT

[75] Inventor: Cesar R. Gonzalez, Madrid, Spain

[73] Assignee: Amper S.A., Madrid, Spain

[21] Appl. No.: 98,194

[22] Filed: Nov. 27, 1979

[30] Foreign Application Priority Data

Jun. 21, 1979 [ES] Spain .................................... 244.069

[51] Int. Cl.³ ............................................. H04M 3/22
[52] U.S. Cl. ............................................. 179/18 FA
[58] Field of Search ........... 179/18 F, 18 FA, 18 HB, 179/84 R, 84 A, 2 A; 331/65

[56] References Cited

U.S. PATENT DOCUMENTS 3,835,258  9/1974  Le Cardonnel ................ 179/18 HB Primary Examiner—Thomas A. Robinson
Attorney, Agent, or Firm—Wenderoth, Lind & Ponack

[57] ABSTRACT

A current detector circuit, preferably for use in telephone equipment, to detect the on-hook and off-hook conditions of of such equipment, includes two equal transformers which have primary coils mounted in series and secondary coils mounted in series opposition, but in series with a circuit within which it is desired to detect the current. The primary coils constitute the load of the collector of an NPN transistor. Such collector is connected by means of a resistor to the base of a PNP transistor.

1 Claim, 1 Drawing Figure

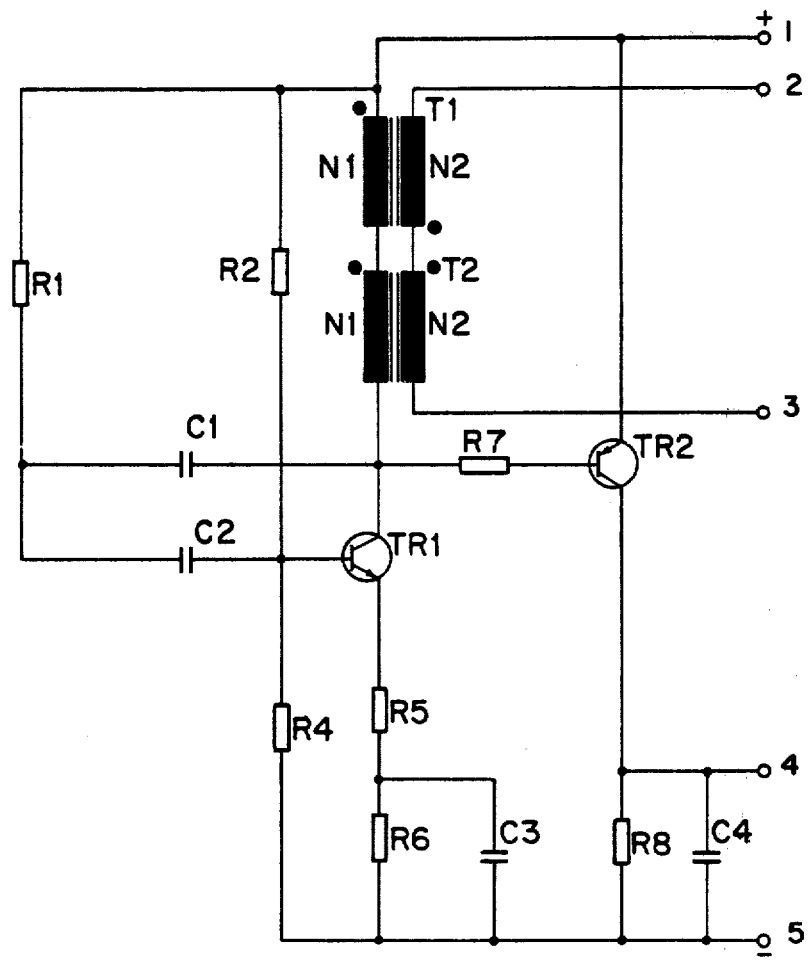

4,310,724

CURRENT DETECTOR CIRCUIT

BACKGROUND AND SUMMARY OF THE INVENTION

The present invention relates to a metering circuit for detecting the presence of electric current in a metered circuit, furnishing at the same time insulation between the metering circuit and the metered circuit where it is desired to detect the current.

Consequently, the circuit of the invention is applicable to auxiliary telephone equipment, such as markers, answering devices, etc., which are controlled by a telephone connected to the line. The on-hook and off-hook conditions of the telephone are detected by the metering circuit which gives orders to the auxiliary equipment.

The detection system or metering circuit of the invention is based on the property of magnetic materials of becoming saturated if the excitation applied is excessive.

As will be discussed later in more detail, the proposed circuit includes the primary coils of two equal transformers, which primary coils are mounted in series. The secondary coils of the transformers are mounted in series opposition with each other and in series with the metered circuit in which the current is desired to be detected.

The transformer primary coils constitute, in accordance with the invention, the load of the collector of an NPN transistor, which has its emitter connected to a negative terminal through a resistor-condenser cell, and its base, polarized through a resistive divider, fedback from its collector, through two condensers in series which, at their point of union, are connected to a positive terminal with the interposition of a resistor.

Lastly, and as will be made evident below, the collector of the NPN transistor is connected also, through a resistor, to the base of a PNP transistor which has its emitter connected to the positive terminal and its collector to the negative terminal, this last connection through a resistor-condenser unit.

BRIEF DESCRIPTION OF THE DRAWING

The characteristics and the manner of operation of the proposed circuit will be better understood from the following description with reference to the attached drawing wherein the single figure is an electrical diagram of the invention.

DETAILED DESCRIPTION OF THE INVENTION

In effect, as has been explained, the circuit of the invention includes equal transformers T1 and T2 having primary coils N1 mounted in series and secondary coils N2 in series opposition with each other. The primary coils N1 constitute the load of the collector of an NPN transistor TR1, whose base is polarized through a resistive divider R2-R4, connected to circuit terminals 1,5. The emitter of transistor TR1 is connected, through resistor R5, which controls the circuit gain, to a resistor-condenser unit, R6-C3, through which it receives negative feed from terminal 5.

To transistor TR1, polarized as described, is added feedback assembly, capable of provoking the circuit oscillation. The feedback, as shown, is taken from the collector of transistor TR1, and through two condensers in series, C1-C2, which at their point of union have a resistor R1 connected to positive terminal 1, is again injected at the base of the transistor. This feedback assembly, jointly with the collector inductive charge, determines the displacement of phase necessary (180°) so that the circuit may enter into oscillation.

The alternate signal present in the collector of the oscillator transistor TR1 is coupled by means of a resistor R7 to the base of a PNP transistor TR2, which has its emitter connected to the positive terminal 1. In this manner, the semi-cycles of the signal from the oscillator provoke the conduction of transistor TR2 which produces positive pulses in its collector. And since the collector of transistor TR2 is connected to the negative terminal 5, by means of resistor-condenser unit R8-C4 which filters these pulses, there appears at the outlet of the circuit (TR2 collector) a direct voltage which is practically equal to the voltage feeding the circuit.

The secondary coils N2 of transformers T1 and T2 are mounted in series with the circuit where it is desired to detect the current, i.e. the metered circuit, at terminals 2, 3. Because the coils are mounted in series opposition, the oscillator voltages induced in them are mutually cancelled, so that the interferences induced by the oscillator circuit in the circuit where it is desired to measure the current are void. In this way, the oscillator is insensitive to the load of the circuit to be metered.

As direct current passes through the secondary coils N2, saturation of the transformers is produced, which provokes a reduction in the inductance of the same and with this oscillator ceases, so that transistor TR2 does not conduct any more and the positive voltage present in its collector disappears. Terminal 4 is an outlet through which the condition of the metered circuit can be assessed.

Having sufficiently described the object of the invention, its form of operation and the way in which it can be put into practice, what is specified in the claims that follow is declared as new.

I claim:

1. A current detection circuit for detecting current in a circuit to be metered, particularly for the detection of on-hook and off-hook conditions of telephone equipment, said detection circuit comprising:
 first and second equal transformers having primary coils connected series-aiding and secondary coils, said secondary coils being connected in series opposition with each other and adapted to be connected in series with a circuit to be metered;
 an NPN transistor having a collector connected to said primary coils, such that said primary coils form a load of said collector;
 a PNP transistor having a base connected to said collector of said NPN transistor by means of a first resistance, an emitter connected to a positive terminal, and a collector connected to a negative terminal by means of a first resistor-capacitor unit;
 said NPN transistor having an emitter connected to said negative terminal by means of a second resistor-capacitor unit;
 a resistive-divider connected to the base of said NPN transistor and to said positive terminal and forming means for polarizing said base of said NPN transistor; and
 feedback means for providing feedback from said collector of said NPN transistor to said base of said NPN transistor and for provoking circuit oscillation, said feedback means comprising first and second condensers connected in series between said collector and base of said NPN transistor, and a junction between said first and second condensers being connected to said positive terminal by means of a second resistor.

* * * * *